United States Patent

Hörmann

[11] Patent Number: 5,868,639
[45] Date of Patent: Feb. 9, 1999

[54] POSITIVE ENGAGEMENT DRIVE

[75] Inventor: Thomas J. Hörmann, St. Wendel, Germany

[73] Assignee: Hörmann KG Verkaufsgesellschaft, Steinhagen, Germany

[21] Appl. No.: 716,455

[22] PCT Filed: Mar. 17, 1995

[86] PCT No.: PCT/DE95/00373

§ 371 Date: Oct. 31, 1996

§ 102(e) Date: Oct. 31, 1996

[87] PCT Pub. No.: WO95/25233

PCT Pub. Date: Sep. 21, 1995

[30] Foreign Application Priority Data

Mar. 17, 1994 [DE] Germany ............ 44 09 208.3
Jan. 17, 1995 [DE] Germany ............ 195 01 230.5

[51] Int. Cl.$^6$ ............................................. F16G 1/28
[52] U.S. Cl. ........................ 474/205; 474/270; 198/845; 198/847
[58] Field of Search ................................ 474/267, 268, 474/270, 205, 204; 198/267, 268, 270

[56] References Cited

U.S. PATENT DOCUMENTS

| 208,432 | 9/1878 | Spadone | 474/270 |
| 4,072,062 | 2/1978 | Morling et al. | |
| 4,637,511 | 1/1987 | Johnson et al. | 474/270 X |
| 5,013,286 | 5/1991 | Breher | 474/205 |
| 5,123,881 | 6/1992 | Btautigam et al. | 475/205 X |

FOREIGN PATENT DOCUMENTS 24874 11/1909 United Kingdom .

Primary Examiner—Roger J. Schoeppel
Attorney, Agent, or Firm—Max Fogiel

[57] ABSTRACT

Drive with a belt-driving wheel and a belt-motion deflector with a transmission member in the form of a belt wrapping around them in a continuous loop. The belt is in form-fit engagement with and is driven by at least the belt-driving wheel. Structures are distributed at least part-way along the belt and form fit matching structures on at least the belt-driving wheel. The belt is woven and the structures are applied to the belt in a separate step.

17 Claims, 3 Drawing Sheets

POSITIVE ENGAGEMENT DRIVE

BACKGROUND OF THE INVENTION

The present invention concerns a drive. A motion-transmission member in the form of a strap or belt wraps around both a belt-driving wheel and a belt-motion deflector. The belt either constitutes or can be fastened at the ends to constitute a continuous loop. A surface structure extends at least part-way along the belt. The surface structure extends approximately more than half-way along the belt when motion is transmitted back and forth. A matching structure extends along at least the contact surface of the belt-driving wheel. The structure on the surface of the belt-driving wheel fits into and engages the structure on the surface of the belt along the direction that force is being transmitted in.

Drives of this genus are primarily employed to move components back and forth along a limited stretch, to open and close a door panel for example. The mechanisms addressed herein, however, are not only those that move along a limited stretch or back and forth between two points. The drives employed for such purposes can transmit motion either by friction or by means of form-fit ("formschlüssig") components, chains and cogged belts in particular. Form fit between part of the member attached to the component being moved on the one hand and the belt-driving wheel on the other is satisfactory for back-and-forth motions over limited stretches. A door panel for example can be operated by a motor-powered chain wheel if the wheel engages a chain-like section of a continuous-loop motion-transmission member that the panel is attached to.

The continuous loop makes it possible to avoid long stretches wherein no motion occurs, as in rack-and-pinion mechanisms for example.

One advantage of a drive with form fit is that it cannot slip. Another is the absolute precision, allowing of course for tensional distortion, with which the engaging members can be matched along the stretch in question. Driving force usually needs to be applied only between the output wheel and the belt-shaped motion-transmission member, when, specifically, the latter is directly fastened to the component being moved, which often happens when the motion is back-and-forth. It is on the other hand also possible to transmit the output from the drive by way of the belt-motion deflector, especially if the latter is a wheel, which can then be included if necessary in the interlocking engagement.

SUMMARY OF THE INVENTION

Chains and cogged belts of the conventional genus are relatively expensive and sometimes even noisy. The object of the present invention is to improve the generic drive to the extent that, although it employs form fit, it will be as inexpensive and reliable as one that depends on frictional engagement between a motion-transmission member in the form of the strap or belt that is conventional in such applications and a belt-driving wheel and belt-motion deflector (wheel).

This object is attained in accordance with the present invention in that the surface structure is applied additionally and/or subsequently to a belt produced by weaving and accordingly "smooth-surfaced".

The particularity of this approach is that a belt that especially very practical and cost-effective with respect to manufacture and resistance to deformation can be employed as a point of departure for a form-fit motion-transmission member. The member can be provided in many ways, all simple, with appropriate form-fit structures. One particularly preferred embodiment of such structures are prefabricated coglike elevations cemented or fused to the surface of the belt facing the belt-driving wheel. Preferably by cementing and particularly by fusing. The coglike elevations engage matching coglike shapes at least on the belt-driving wheel. If output occurs by way of the belt-deflecting wheel, that wheel will also be provided with matching coglike shapes.

Since the drives of interest in the present context employ of course a direct coupling between the component being moved (the door panel) and the belt-like motion-transmission member, the belt-deflecting wheel or continuous-loop belt-motion deflector does not need form fit. In such situations, accordingly, the belt-surface structure can be confined to the section that comes into contact with the circumference of the belt-driving wheel during the back-and-forth motion of the component being moved. Such driving shapes in accordance with the present invention are of course accordingly simpler and more cost-effective to manufacture.

The form fit that is characteristic of the engagement between the belt-like motion-transmission member and at least the belt-driving wheel can be attained in many ways, by cogs, restricted for example to a middle section or preferably to two lateral sections as well, by perforations in the belt-like motion-transmission member engaged by a spiked wheel, etc. Various forms of positioning and lateral stabilization can be obtained—a laterally depressed collar-like demarcation of the mutually contacting surfaces of the motion-transmission member and belt-driving wheel or belt-motion deflector, convexity, of the latter in particular, in the event of non form-fit engagement, or, particularly preferred in the present context, a series of equidistant holes at each edge of the belt-shaped motion-transmission member engaged by matching elevations at least along the circumference of the belt-driving wheel.

BRIEF DESCRIPTION OF THE DRAWINGS

Various embodiments of the present invention will now be specified with reference to the accompanying schematic drawing, wherein.

DESCRIPTION OF THE PREFERRED EMBODIMENTS

Figure 1:
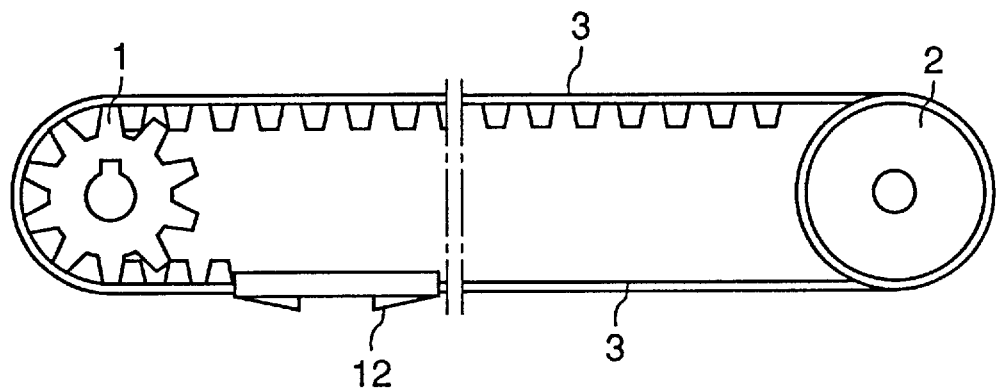
FIG. 1 illustrates a cogged belt with a matching-cogged belt-driving wheel and a belt-deflecting wheel.

The belt-shaped motion-transmission member 3 illustrated in FIG. 1 wraps around both a belt-driving wheel 1 and a belt-deflecting wheel 2. A carriage 12 for attaching a door panel moves back and forth on a strand of motion-transmission member 3. The ends of the belt-like motion-transmission member are attached and can be detached, possibly in the vicinity of door-panel carriage 12, creating a continuous-loop belt. Part of the total length of motion-transmission member 3 is provided with cogs 4 that face the circumference of belt-driving wheel 1. The cogged section is accordingly limited to the form-fit torque-transmission stretch necessary for moving door-panel carriage 12 back and forth and wherein the belt-like motion-transmission member engages the circumference of belt-driving wheel 1. Since belt-deflecting wheel 2 does not drive anything, it is not form fit to the belt-like motion-transmission member. The embodiments to be specified hereinafter are all variations of this basic form, and they are all to be interpreted as lacking form fit with the belt-like motion-transmission member.

Figure 2:
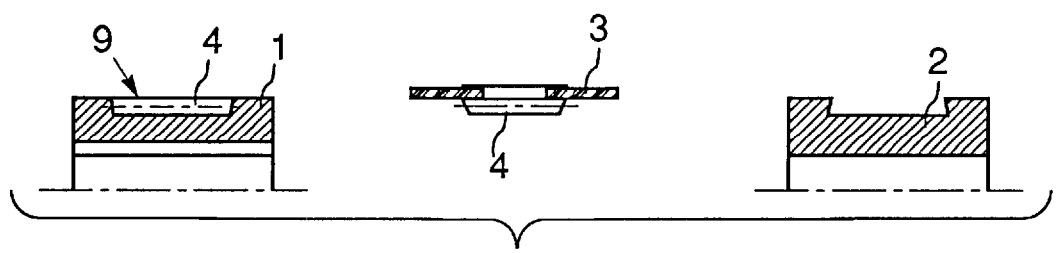
FIGS. 2 through 6 are sections through a belt-driving wheel, a belt-shaped drive, and a belt-motion deflector with various form-fit structures.

FIG. 2 is a section through part of an belt-driving wheel 1 with a series of cogs and gaps 4 along the middle of its outer surface. They are reproduced along the woven belt-like motion-transmission member 3 schematically illustrated at the middle of the figure by subsequent molding, cementing, fusing, etc. The belt-deflecting wheel 2 illustrated in schematic section at the right of the figure has no cogs but only a groove along its circumference to accommodate any cogs that come into contact with it.

Figure 3:
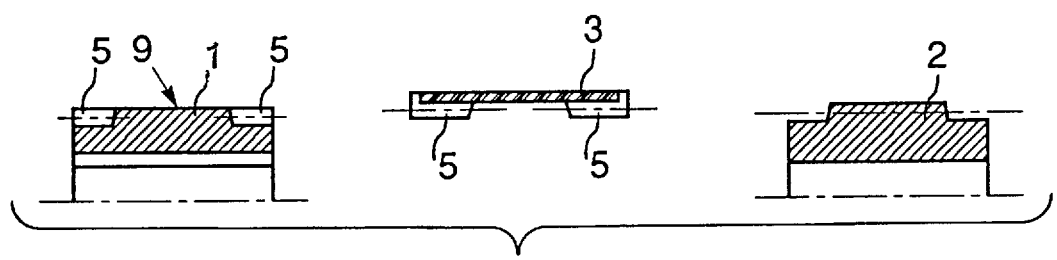

The cogs 5 illustrated in FIG. 3 extend not along the middle of motion-transmission member 3 as do those illustrated in FIG. 2, but along the edges. They engage matching cogs 5 along each edge of the circumference of belt-driving wheel 1. These cogs are again applied to motion-transmission member 3 not while it is being woven. They need not absolutely be applied directly subsequent to weaving, although it is essential that they be applied by a different process. Belt-deflecting wheel 2 has depressions along the edges of its circumference to prevent form fit to motion-transmission member 3.

Figure 4:
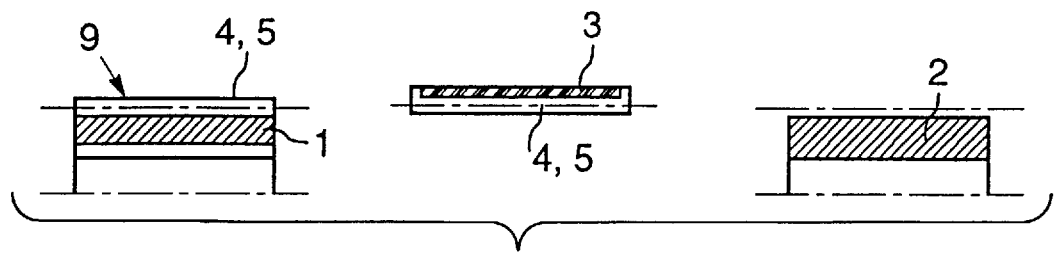

FIG. 4 illustrates cogs that extend at least approximately all the way across motion-transmission member 3, strictly to demonstrate that the cogs can be of any shape, even sloping or V-shaped for instance.

Figure 5:
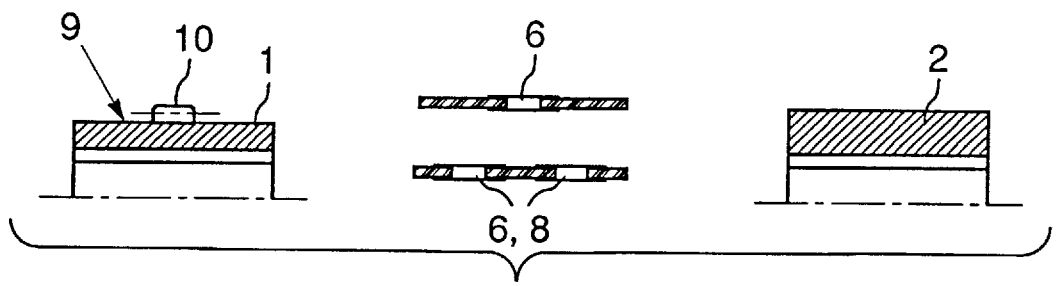
Figure 6:
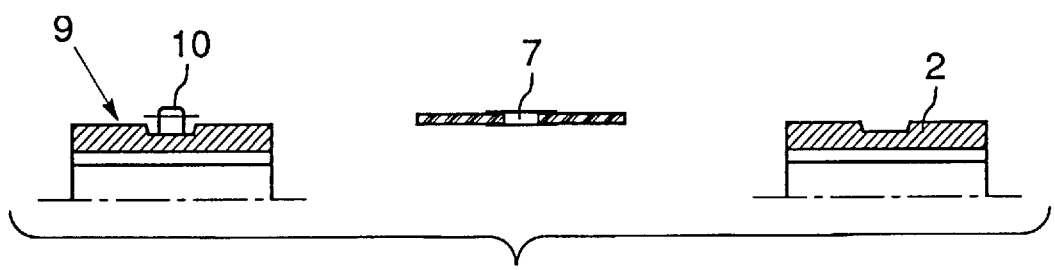

FIGS. 5 and 6 illustrate by way of example more or less of a reversal in the form fit between belt-like motion-transmission member 3 and belt-driving wheel 1. In this embodiment motion-transmission member 3 has not subsequently applied elevations but openings that are engaged by matching elevations along the circumference of belt-driving wheel 1. The openings can be punched or burned out of motion-transmission member 3, leaving fused edges if the member is thermoplastic. Motion-transmission member 3 could also be provided with eyelets 7, also with reinforced edges. Basically, it is possible as illustrated in FIG. 6 to create a belt-like transmission member with intermediate structures provided with the form-fit structures and extending along the middle for example, resulting in two adjacent belts with an intermediate structure between them.

The belt-deflecting wheel 2 illustrated in FIG. 5 is convex, which facilitates positioning motion-transmission member 3. The circumference of the belt-deflecting wheel 2 illustrated in FIG. 6 is again provided with a depression that matches the particular intermediate structure illustrated. From FIG. 5 it can also be gathered that, as in FIGS. 2 and 3, one or more form-fit structures in the form of rows of openings in belt-like motion-transmission member 3. One particular embodiment features rows of openings 6 and 8 along both edges of motion-transmission member 3. Openings 6 and 8 engage corresponding unillustrated elevations along the circumference of at least belt-driving wheel 1. This approach ensures that motion-transmission member 3 will be correctly oriented toward belt-driving wheel 1.

The aforesaid measures involving cogs and/or spines and holes can also be combined, with one type of engagement guiding belt-like motion-transmission member 3 toward at least belt-driving wheel 1 and the other form-fit engaging structures transmitting the driving torque.

The belt-deflecting wheel 2 in the embodiments described hereintofore by way of example do not transmit motion. This is a peculiarity of the mechanism for generating back-and-forth motion specified herein. When on the other hand the motion generated by such a mechanism is not to be confined to a limited stretch but continuous in one direction, the form-fit structures in accordance with the present invention can of course extend all around a belt-like motion-transmission member 3 in the form of a closed loop. Torque can in that event be transmitted form-fit to an output wheel in the form of belt-deflecting wheel 2 from belt-driving wheel 1 by such a motion-transmission member 3.

Figure 7:
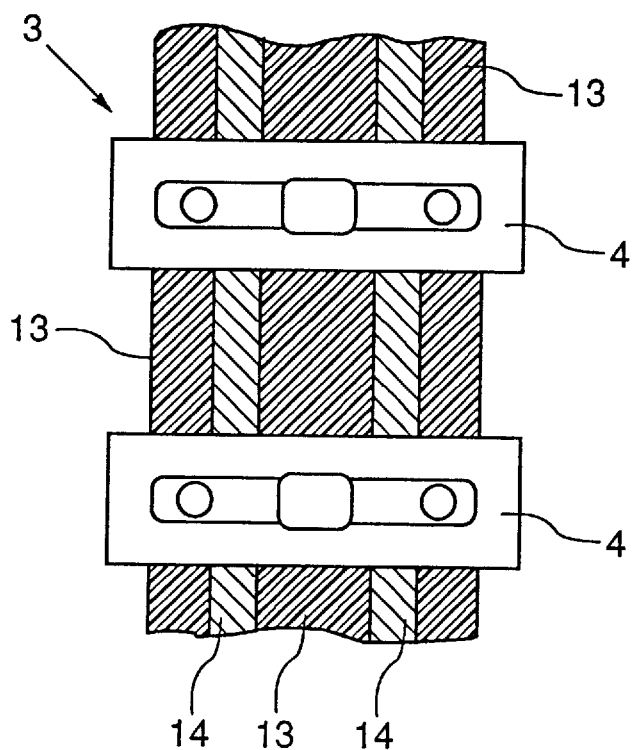
FIG. 7 is a section through another embodiment of a belt from above.
Figure 8:
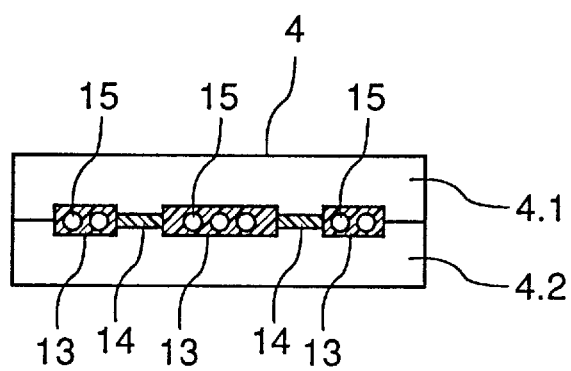
FIG. 8 is a side view of the belt embodiment illustrated in FIG. 7.

FIG. 7 is a section through a motion-transmission member 3 comprising three densely woven strips 13 extending parallel along it and secured and separated by connecting zones 14 of a relatively open mesh. Cogs 4 are molded onto motion-transmission member 3 with at least the interstices in strip-connecting zones 14 being penetrated by the cogs over the whole area. This approach ensures that the cogs will rest secure against motion-transmission member 3. The resulting security is particularly significant along the length of the member and dictates the dimension of the gaps between the cogs. The belt can be reinforced along its length with strong and stretch-resistant cords, allowing it to accommodate tension with practically no expansion.

Motion-transmission member 3 incorporates along its length highly stretch-resistant cords 15 embedded in woven strips 13. Cords 15 are of high-strength plastic, Kevlar fiber for example.

Strip-connecting zones 14 are not as thick as strips 13. Outer strips 13 have two cords 15 and middle strip three. Strips 13 are of polyester belting and strip-connecting zones 14 are woven of polyamide.

The cogs 4 secured to motion-transmission member 3 are in two halves 4.1 and 4.2, one on each surface of the belt. The two halves engage each other either form-fit or force-fit (kraftschlüssig). The engagement occurs particularly in the vicinity of strip-connecting zones 14.

I claim:

1. A drive comprising a motion-transmission member in the form of a strap or belt wrapped around both a belt-driving wheel and a belt-motion deflector; said belt comprising a continuous loop; a surface structure extending at least part-way along said belt and substantially more than half-way along said belt when motion is transmitted back and forth; a matching structure extending along at least a contact surface of said belt-driving wheel; said belt-driving wheel having a surface fitting into and engaging said surface structure of the belt along a direction in which force is transmitted; said surface structure being a weaved structure and being smooth surfaced, said surface structure penetrating the belt in at least some areas; said belt comprising three densely woven strips extending along the belt and secured and separated by connecting zones of substantially open mesh; cogs formed by material on the belt, said mesh having interstices penetrated by said material of said cogs, said connecting zones holding together said woven strips and being gripping points for said cogs as well as providing flexibility of said belt, said cogs projecting through said open mesh for securing to said belt.

2. A drive as defined in claim 1, wherein said belt is woven out of plastic threads.

3. A drive as defined in claim 1, wherein said surface structure comprises a plurality of elevations acting as cogs and engaging matching depressions in at least said contact surface of said belt-driving wheel.

4. A drive as defined in claim 3, wherein said cogs extend along a middle part of the belt.

5. A drive as defined in claim 3, wherein said cogs extend along each side of a middle part of the belt.

6. A drive as defined in claim 1, wherein said surface structure includes depressions engaged by matching elevations on said contact surface of at least said belt-driving wheel.

7. A drive as defined in claim 1, wherein cutouts or openings in said surface structure are reinforced by fusing an area of the belt comprising their circumference.

8. A drive as defined in claim 1, wherein cutouts or openings in said surface structure are eyelets or similar separate components.

9. A drive as defined in claim 1, wherein said cogs are fused in the form of separate components to the surface of the belt.

10. A drive as defined in claim 1, wherein said cogs are molded or injected onto an already fabricated belt, molding material for said cogs penetrating into and enclosing the belt.

11. A drive as defined in claim 1, wherein said surface structure extends at least part-way along the belt and approximately more than half-way along the belt when motion is transmitted back and forth.

12. A device as defined in claim 10, including a door-panel carriage, said belt having longitudinal highly stretch-resistant cords.

13. A drive as defined in claim 12, wherein said cords are in said woven strips.

14. A drive as defined in claim 11, wherein said connecting zones are less thick than said woven strips.

15. A drive as defined in claim 1, wherein said cogs comprise two halves, each surface of the belt having one of said halves engaging each other by either form-fit or force-fit.

16. A drive comprising a motion-transmission member in the form of a strap or belt wrapped around both a belt-driving wheel and a belt-motion deflector; said belt comprising a continuous loop; a surface structure extending at least part-way along said belt and substantially more than half-way along said belt when motion is transmitted back and forth; a matching structure extending along at least a contact surface of said belt-driving wheel; said belt-driving wheel having a surface fitting into and engaging said surface structure of the belt along a direction in which force is transmitted; said surface structure being a weaved structure and being smooth surfaced, said surface structure penetrating the belt in at least some areas; said belt comprising three densely woven strips extending along the belt and secured and separated by connecting zones of substantially open mesh; cogs formed by material on the belt, said mesh having interstices penetrated by said material of said cogs, said connecting zones holding together said woven strips and being gripping points for said cogs as well as providing flexibility of said belt, said cogs projecting through said open mesh for securing to said belt; said cogs comprising two halves, each surface of the belt having one of said halves engaging each other by either form-fit or force-fit; said belt having longitudinal highly stretch-resistant cords.

17. A drive comprising a motion-transmission member in the form of a strap or belt wrapped around both a belt-driving wheel and a belt-motion deflector; said belt comprising a continuous loop; a surface structure extending at least part-way along said belt and substantially more than half-way along said belt when motion is transmitted back and forth; a matching structure extending along at least a contact surface of said belt-driving wheel; said belt-driving wheel having a surface fitting into and engaging said surface structure of the belt along a direction in which force is transmitted; said surface structure being a weaved structure and being smooth surfaced, said surface structure penetrating the belt in at least some areas; said belt comprising three densely woven strips extending along the belt and secured and separated by connecting zones of substantially open mesh; cogs formed by material on the belt, said mesh having interstices penetrated by said material of said cogs, said connecting zones holding together said woven strips and being gripping points for said cogs as well as providing flexibility of said belt, said cogs projecting through said open mesh for securing to said belt; said belt being woven out of plastic threads; said surface structure comprising a plurality of elevations acting as cogs and engaging matching depressions in at least said contact surface of said belt-driving wheel; said cogs extending along a middle part of said belt; said surface structure including depressions engaged by matching elevations on said contact surface of at least said belt-driving wheel; said surface structure having cutouts reinforced by fusing an area of the belt and comprising their circumference; said cutouts comprising eyelets; said cogs being fused in form of separate components to the surface of the belt; said cogs being molded onto an already fabricated belt; molding material for said cogs penetrating into and enclosing the belt; said surface structure extending at least part-way along the belt and substantially more than half-way along the belt when motion is transmitted back and forth; said belt having longitudinal highly stretch-resistant cords in said woven strips; said connecting zones being less thick than said woven strips; said cogs comprising two halves, each surface of the belt having one of said halves engaging each other by either form-fit or force-fit.

* * * * *